(12) United States Patent
Packer et al.

(10) Patent No.: US 10,844,724 B2
(45) Date of Patent: Nov. 24, 2020

(54) ADDITIVELY MANUFACTURED HOLLOW BODY COMPONENT WITH INTERIOR CURVED SUPPORTS

(71) Applicant: General Electric Company, Schenectady, NY (US)

(72) Inventors: Travis J Packer, Simpsonville, SC (US); Elisabeth Kraus Black, Greenville, SC (US); Robert William Davidoff, Pittsburgh, PA (US); Zachary John Snider, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 438 days.

(21) Appl. No.: 15/632,656

(22) Filed: Jun. 26, 2017

(65) Prior Publication Data

US 2018/0371920 A1 Dec. 27, 2018

(51) Int. Cl.
| | |
|---|---|
| *F01D 5/14* | (2006.01) |
| *F01D 5/18* | (2006.01) |
| *B22F 5/10* | (2006.01) |
| *F01D 9/06* | (2006.01) |
| *B22F 3/105* | (2006.01) |
| *B22F 5/04* | (2006.01) |

(Continued)

(52) U.S. Cl.
CPC .............. *F01D 5/147* (2013.01); *B22F 5/106* (2013.01); *F01D 5/141* (2013.01); *F01D 5/18* (2013.01); *F01D 5/189* (2013.01); *F01D 9/065* (2013.01); *B22F 3/1055* (2013.01); *B22F 5/04* (2013.01); *B22F 2003/1058* (2013.01); *B29C 67/246* (2013.01); *B33Y 80/00* (2014.12); *F05D 2250/75* (2013.01)

(58) Field of Classification Search
CPC .......... F01D 5/147; F01D 5/189; F01D 9/065; F01D 5/18; F01D 5/141; B22F 5/106; B22F 2003/1058; B22F 3/1055; B22F 5/04; F05D 2250/75; B29C 67/246; B33Y 80/00; Y02T 50/60; Y02P 10/25
USPC ......................................................... 416/96
See application file for complete search history.

(56) References Cited

U.S. PATENT DOCUMENTS

| 4,802,823 A | | 2/1989 | Decko et al. |
|---|---|---|---|
| 5,328,331 A | * | 7/1994 | Bunker ................... F01D 5/187 415/115 |

(Continued)

*Primary Examiner* — Joseph J Dallo
*Assistant Examiner* — Scott A Reinbold
(74) *Attorney, Agent, or Firm* — James Pemrick; Hoffman Warnick LLC (57) ABSTRACT

A hollowed body component made by additive manufacturing is disclosed. The hollow body has a longitudinal extent, an exterior surface and an interior surface, the interior surface having a first side and an opposing, second side. A first set of curved supports are curved along lengths thereof and extend between the first side and the opposing, second side to support the hollow body at least during the additive manufacturing thereof. Some embodiments include cooling passages open to the interior surface. Here, the curved supports extend between opposing pairs of passage-free spaces on the interior surface to support the hollow body at least during the additive manufacturing thereof. In one example, the component is an impingement insert for a hot gas path component.

15 Claims, 10 Drawing Sheets

(51) Int. Cl.
*B29C 67/24* (2006.01)
*B33Y 80/00* (2015.01)

(56) References Cited

U.S. PATENT DOCUMENTS

| | | | | |
|---|---|---|---|---|
| 6,000,908 | A * | 12/1999 | Bunker | F01D 5/189 165/908 |
| 6,769,875 | B2 * | 8/2004 | Tiemann | F01D 5/189 416/233 |
| 7,497,655 | B1 * | 3/2009 | Liang | F01D 5/189 415/1 |
| 7,871,246 | B2 * | 1/2011 | Liang | F01D 5/187 416/97 R |
| 8,123,489 | B2 | 2/2012 | Udall et al. | |
| 9,121,286 | B2 | 9/2015 | Dolansky et al. | |
| 9,611,745 | B1 * | 4/2017 | Jones | F01D 5/189 |
| 10,316,668 | B2 * | 6/2019 | Blake | F01D 5/181 |
| 2006/0120870 | A1 * | 6/2006 | Trindade | F01D 5/18 416/97 R |
| 2009/0010765 | A1 * | 1/2009 | Propheter-Hinckley | F01D 5/188 416/97 R |
| 2010/0143143 | A1 * | 6/2010 | Judge | B29C 66/124 416/226 |
| 2011/0123351 | A1 * | 5/2011 | Hada | F01D 5/189 416/97 R |
| 2013/0071255 | A1 * | 3/2013 | Yokoyama | F01D 5/186 416/97 R |
| 2013/0276460 | A1 * | 10/2013 | Propheter-Hinckley | B23P 15/02 60/806 |
| 2013/0276461 | A1 * | 10/2013 | Propheter-Hinckley | F04D 29/325 60/806 |
| 2013/0280059 | A1 * | 10/2013 | Dolansky | F01D 5/147 415/208.1 |
| 2014/0093379 | A1 * | 4/2014 | Tibbott | F01D 5/189 416/224 |
| 2014/0102684 | A1 * | 4/2014 | Sezer | F01D 5/288 165/168 |
| 2014/0301859 | A1 * | 10/2014 | Hancock | B29C 70/84 416/230 |
| 2015/0184519 | A1 * | 7/2015 | Foster | F01D 5/188 416/96 R |
| 2017/0101871 | A1 * | 4/2017 | Tiedemann | F01D 9/041 |
| 2017/0101932 | A1 * | 4/2017 | Stover | F01D 25/12 |

* cited by examiner

ADDITIVELY MANUFACTURED HOLLOW BODY COMPONENT WITH INTERIOR CURVED SUPPORTS

BACKGROUND OF THE INVENTION

The disclosure relates generally to additive manufacturing, and more particularly, to an additively manufactured hollow body component having interior curved supports. The component can be an impingement insert for hot gas path component in which case the curved supports extend between passage-free spaces on an interior surface of the sleeve.

The pace of change and improvement in the realms of power generation, aviation, and other fields has accompanied extensive research for manufacturing components used in these fields. Conventional manufacture of metallic, plastic or ceramic composite components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system.

Additive manufacturing (AM) includes a wide variety of processes for producing an component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component.

Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the component is completely formed.

Hollow body components present challenges for supporting the structure thereof during additive manufacture. One example hollow body component includes an impingement insert, which is an elongated hollow body component that includes a number of cooling passages that extend from an interior thereof. The impingement insert is employed in a hot gas path component, like a gas turbine nozzle, to distribute a cooling fluid to the HGP component. Historically, impingement inserts were made of sheet metal or molded steel and were not made by additive manufacturing because their elongated, thin walls are subject to large amounts of deformation and/or distortion, e.g., during metal powder AM processes such as DMLM. The deformation challenges are present in a large variety of hollow body components in addition to impingement inserts.

BRIEF DESCRIPTION OF THE INVENTION

A first aspect of the disclosure provides a component made by additive manufacturing, the component comprising: a hollow body having a longitudinal extent, an exterior surface and an interior surface, the interior surface having a first side and an opposing, second side; and a first set of curved supports curved along lengths thereof and extending between the first side and the opposing, second side to support the hollow body at least during the additive manufacturing thereof.

A second aspect of the disclosure provides an impingement insert for a hot gas path component, the impingement insert made by additive manufacturing, the impingement insert comprising: a hollow body having a longitudinal extent, an exterior surface and an interior surface, the interior surface having a first side and an opposing, second side; a plurality of cooling passages passing between the exterior surface and the interior surface, the plurality of cooling passages arranged on the interior surface to have a first opposing pair of a first passage-free space extending along a first portion of the longitudinal extent on the first side and a second, opposing passage-free space extending along a second portion of the longitudinal extent on the opposing, second side; and a first set of curved supports extending between the first opposing pair of the first passage-free space and the second, opposing passage-free space to support the hollow body at least during the additive manufacturing thereof.

A third aspect of the disclosure provides a non-transitory computer readable storage medium storing code representative of an impingement insert for a hot gas path component, the impingement insert physically generated upon execution of the code by a computerized additive manufacturing system, the code comprising: code representing the impingement insert, the impingement insert including: a hollow body having a longitudinal extent, an exterior surface and an interior surface, the interior surface having a first side and an opposing, second side; a plurality of cooling passages passing between the exterior surface and the interior surface, the plurality of cooling passages arranged on the interior surface to have a first opposing pair of a first passage-free space extending along a first portion of the longitudinal extent on the first side and a second, opposing passage-free space extending along a second portion of the longitudinal extent on the opposing, second side; and a first set of curved supports extending between the first opposing pair of the first passage-free space and the second, opposing passage-free space to support the hollow body at least during the additive manufacturing thereof.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing a hollow body component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "longitudinal extent" indicates a length of hollow body component. A "plurality" is any number greater than one, and a "set" is a plurality configured to work together or having a common aspect. It is often required to describe parts that are at differing radial positions with regard to a center axis, e.g., of a turbomachine. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel or generally parallel to an axis. Finally, the term "circumferential" refers to movement or position around an axis. It will be appreciated that such terms may be applied in relation to the center axis of a turbomachine in which a component according to the disclosure may be employed.

As indicated above, the disclosure provides an additively manufactured hollow body component having interior curved supports. In on example, the hollow body component can be an impingement insert for hot gas path component in which case the curved supports extend between passage-free spaces on an interior surface of the sleeve. The curved supports allow for additive manufacture of a hollowed body component such as an impingement insert with exceptionally low deformation and/or deflection, e.g., approximately 0.4 millimeters. Where the hollowed body component includes an impingement insert, the curved supports provide a maximum amount of connection between the two sides with the least amount of airflow blockage. Additionally, the curved supports are arranged to avoid blocking cooling passages in the impingement insert by landing on passage-free spaces between the cooling passages.

Figure 1:
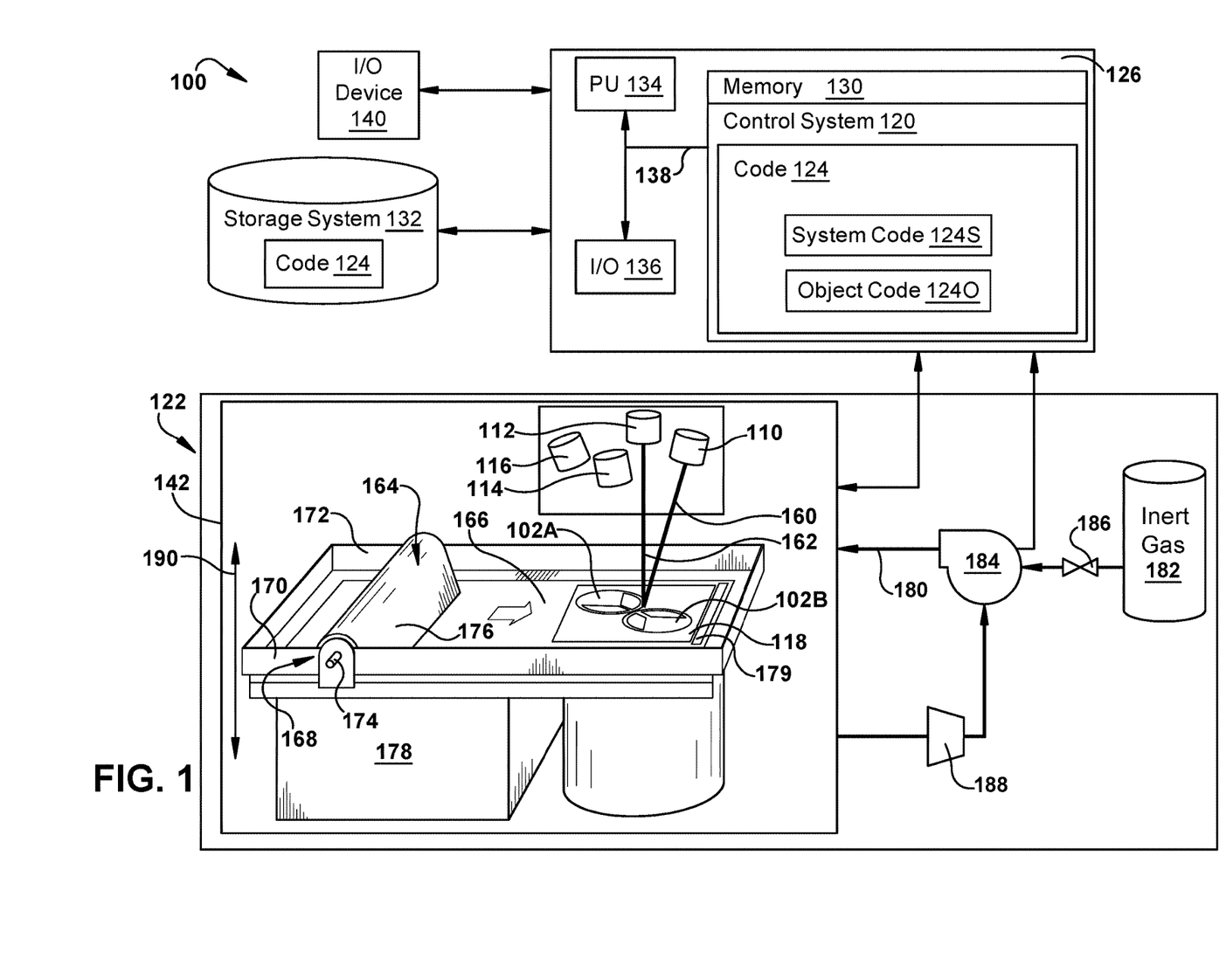
FIG. 1 shows a block diagram of an additive manufacturing process including a non-transitory computer readable storage medium storing code representative of a hollow body component according to embodiments of the disclosure.

FIG. 1 shows a schematic/block view of an illustrative computerized metal powder additive manufacturing system 100 (hereinafter 'AM system 100') for generating a hollow body component(s) 102, which may include one large component or multiple components, e.g., two components 102A, 102B as shown, of which only a single layer is shown. The teachings of the disclosures will be described relative to building component(s) 102 using multiple melting beam sources, e.g., four lasers 110, 112, 114, 116, but it is emphasized and will be readily recognized that the teachings of the disclosure are equally applicable to build component(s) 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing.

AM system 100 generally includes a metal powder additive manufacturing control system 120 ("control system") and an AM printer 122. As will be described, control system 120 executes object code 124 to generate component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes code 124 to generate component(s) 102. Code 124 can include, inter alia, a set of computer-executable instructions (herein referred to as 'system code 124S') for operating AM printer 122 or other system parts, and a set of computer-executable instructions (herein referred to as 'object code 124O') defining component(s) 102 to be physically generated by AM printer 122. As described herein, additive manufacturing processes begin with a non-transitory computer readable storage medium (e.g., memory 130, storage system 132, etc.) storing code 124. System code 124S for operating AM printer 122 may include any now known or later developed software code capable of operating AM printer 122 and/or other system parts.

Object code 124O defining component(s) 102 may include a precisely defined 3D model of a component and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional component to be fabricated on any AM printer. Object code 124O representative of component(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and 124O, dividing component(s) 102 into a series of thin slices that assembles using AM printer 122 in successive layers of material.

AM printer 122 may include a processing chamber 142 that is sealed to provide a controlled atmosphere for component(s) 102 printing. A build platform 118, upon which component(s) 102 is/are built, is positioned within processing chamber 142. A number of melting beam sources 110, 112, 114, 116 are configured to melt layers of metal powder on build platform 118 to generate component(s) 102. While four melting beam sources 110, 112, 114, 116 will be described herein, it is emphasized that the teachings of the disclosure are applicable to a system employing any number of sources, e.g., 1, 2, 3, or 5 or more.

Figure 2:
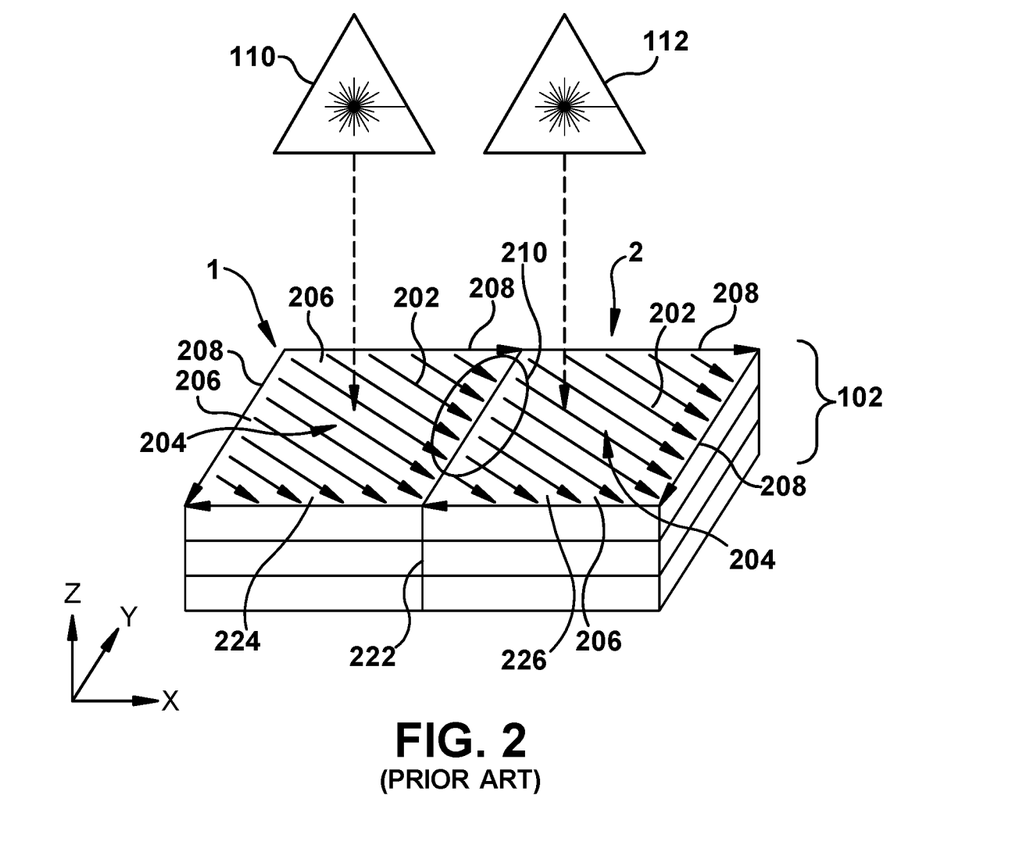
FIG. 2 shows a schematic perspective view of a two melting beam source additive manufacturing system building a component.

FIG. 2 shows a schematic perspective view of melting beams of AM system using two melting beam sources 110, 112, e.g., lasers. During operation, the melting beam(s) (dashed lines) are guided, e.g., by scanner mirrors for lasers or electromagnetic field/electric coils for electron beams, along scan vectors (paths), which are indicated by arrows on a top surface of illustrative component 102. Internal scan vectors 202 melt inner regions 204 of hollow body hollow body component 200 that scan linearly across a layer, and a very thin border 206 is melted with one to three contour scan vectors 208 that only follow a desired outer edge of the layer. Each laser 110, 112 has its own field (1 and 2, respectively) upon which it can work. Each melting beam source 110, 112 may work within only a small portion of its respective field at any given time. Each field and the scan vectors are assigned to one or the other source 110, 112 with an interface 210 (within circle) where fields 1, 2 of pair of sources 110, 112 meet. Which scan vector is made by which source usually depends on the region that can be reached by each source. Each melting beam source 110, 112 is calibrated in any now known or later developed manner. That is, each melting beam source 110, 112 has had its laser or electron beam's anticipated position relative to build platform 118 correlated with its actual position in order to provide an individual position correction (not shown) to ensure its individual accuracy. Here, fields 1, 2 meet at a line, creating a planar interface 222 in hollow body hollow body component 200.

Figure 3:
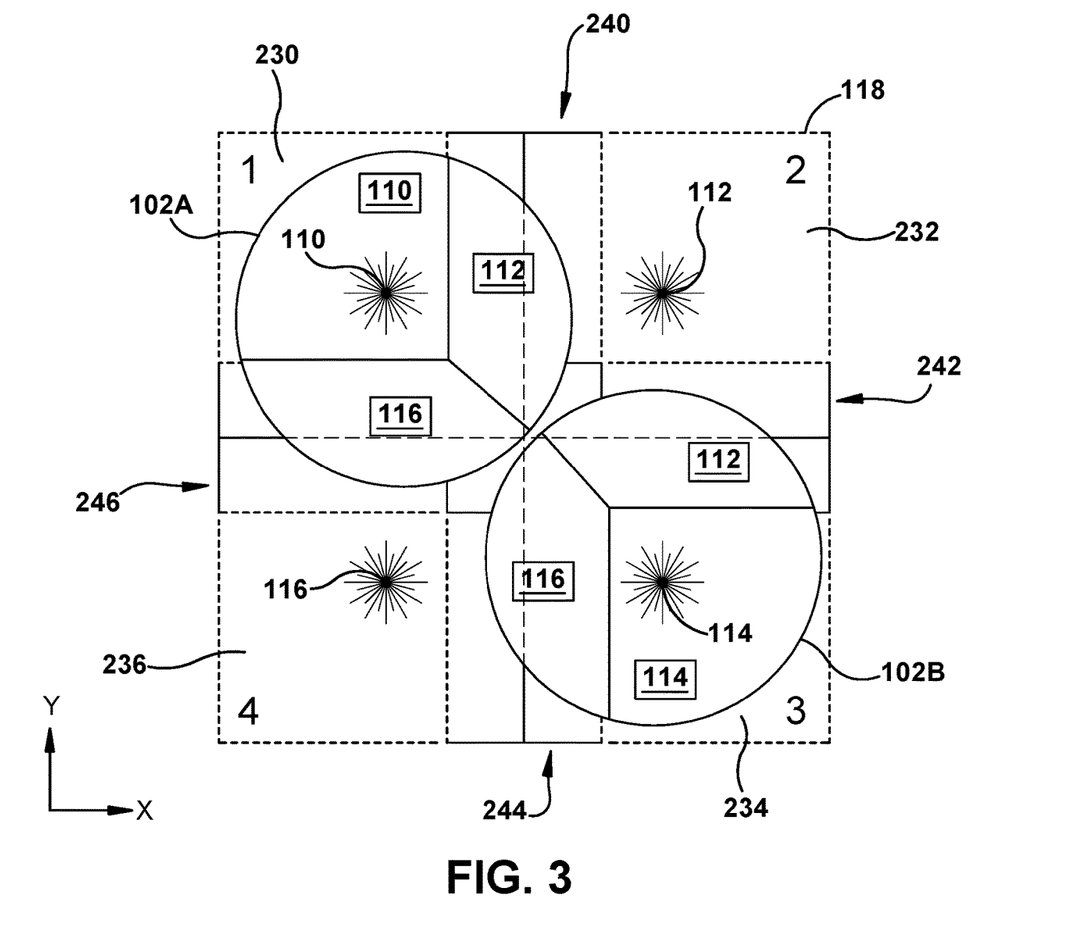
FIG. 3 shows a schematic plan view of respective fields of a four melting beam source additive manufacturing system.
Figure 4:
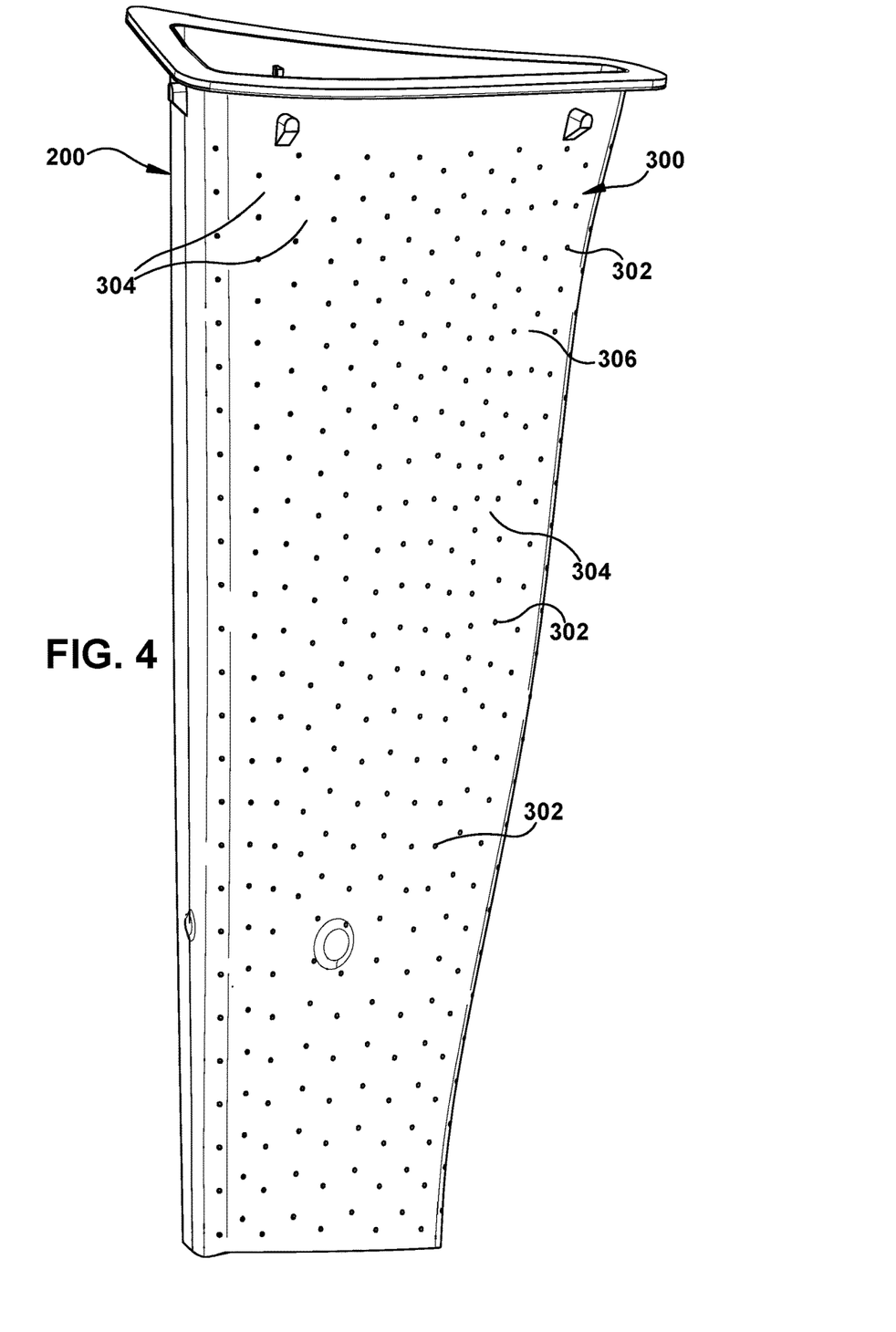
FIG. 4 shows a perspective view of a hollow body component according to embodiments of the disclosure.

FIG. 3 shows a schematic plan view of melting beams of AM system using four melting beam sources 110, 112, 114, 116, e.g., lasers. Each melting beam source 110, 112, 114, 116 has a field 1, 2, 3 or 4 including a non-overlapping field region 230, 232, 234, 236, respectively, in which it can exclusively melt metal powder, and at least one overlapping field region or interfaces 240, 242, 244, 246 in which two or more sources can melt metal powder. (Boxed numbers of sources 110, 112, 114, 116 indicate which source creates the shape illustrated thereabout). In this regard, each melting beam source 110, 112, 114, 116 may generate a melting beam (two shown, 160, 162, in FIG. 1), respectively, that fuses particles for each slice, as defined by object code 124O. For example, in FIG. 1, melting beam source 110 is shown creating a layer of component 102 using melting beam 160 in one region, while melting beam source 112 is shown creating a layer of component 102 using melting beam 162 in another region. Each melting beam source 110, 112, 114, 116 is calibrated in any now known or later developed manner. That is, each melting beam source 110, 112, 114, 116 has had its laser or electron beam's anticipated position relative to build platform 118 correlated with its actual position in order to provide an individual position correction (not shown) to ensure its individual accuracy. In one embodiment, each of plurality melting beam sources 110, 112, 114, 116 may create melting beams, e.g., 160, 162 (FIG. 1), having the same cross-sectional dimensions (e.g., shape and size in operation), power and scan speed. It is recognized that while four sources 110, 112, 114, 116 have been illustrated to describe an interface for overlapping fields, any two sources may create overlapping fields.

Returning to FIG. 1, an applicator 164 may create a thin layer of raw material 166 spread out as the blank canvas from which each successive slice of the final component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a body 176 configured to move along opposing rails 170, 172, and an actuator element (not shown in FIG. 1) in the form of a tip, blade or brush configured to spread metal powder evenly over build platform 118, i.e., build platform 118 or a previously formed layer of component(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 1, a stock of raw material may be held in a raw material source 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any reactive metal such as but not limited to: H13 tool steel, titanium CP, Ti-6Al-4V and 7Nb, 316L and 17-4PH SS cobalt-chrome (ASTM75), aluminum Al—Si-12 and Inconel 718 and 62.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142 from source of inert gas 182. Control system 120 also controls AM printer 122, and in particular, applicator 164 (e.g., linear actuator 174) and melting beam sources 110, 112, 114, 116 to sequentially melt layers of metal powder on build platform 118 to generate component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Referring to FIGS. 4-11 a hollow body component 200 made by additive manufacturing according to embodiments of the disclosure will now be described. Hollow body component 200 can be made using AM system 100, as described herein relative to generic component 102. In one example, hollow body component 200 includes an impingement insert 300 (also referred to as an 'impingement sleeve'). As understood in the art, an impingement insert 300 is employed in a hot gas path (HGP) component (not shown) of, for example, a turbomachine like a gas turbine or steam turbine, to distribute a cooling fluid to the HGP component. The HGP component may include, for example, a nozzle or blade of a turbomachine having a hollow interior into which impingement insert 300 is positioned. Typically, a cooling fluid like air or steam is supplied to an interior of impingement insert 300, and exits through cooling passages 302. The exiting cooling fluid impinges on an interior surface of the HGP component and cools the HGP component. As noted, historically impingement inserts 300 were made of sheet metal or molded steel and were not made by additive manufacturing because their elongated, thin walls, e.g., approximately 0.5-1.5 mm thick, are subject to large amounts of deformation and/or distortion, e.g., during metal powder AM processes such as DMLM. Further, any supports provided would be expected to block cooling passages, reducing cooling performance. While embodiments of the disclosure are described relative to an impingement insert, it is emphasized that the teachings are applicable to a variety of alternative hollow body components made by additive manufacturing.

Figure 5:
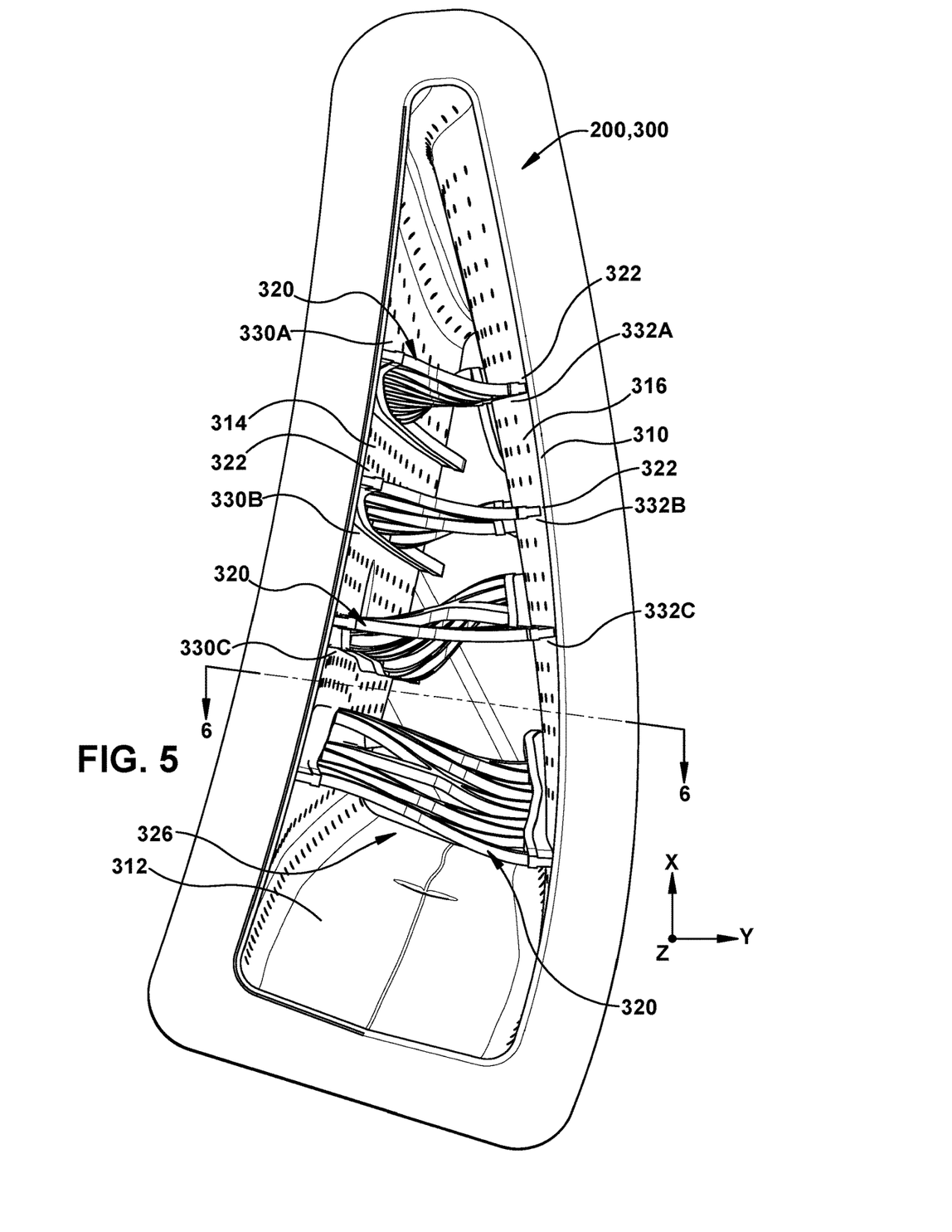
FIG. 5 shows a top view into a hollow body component according to embodiments of the disclosure.
Figure 6:
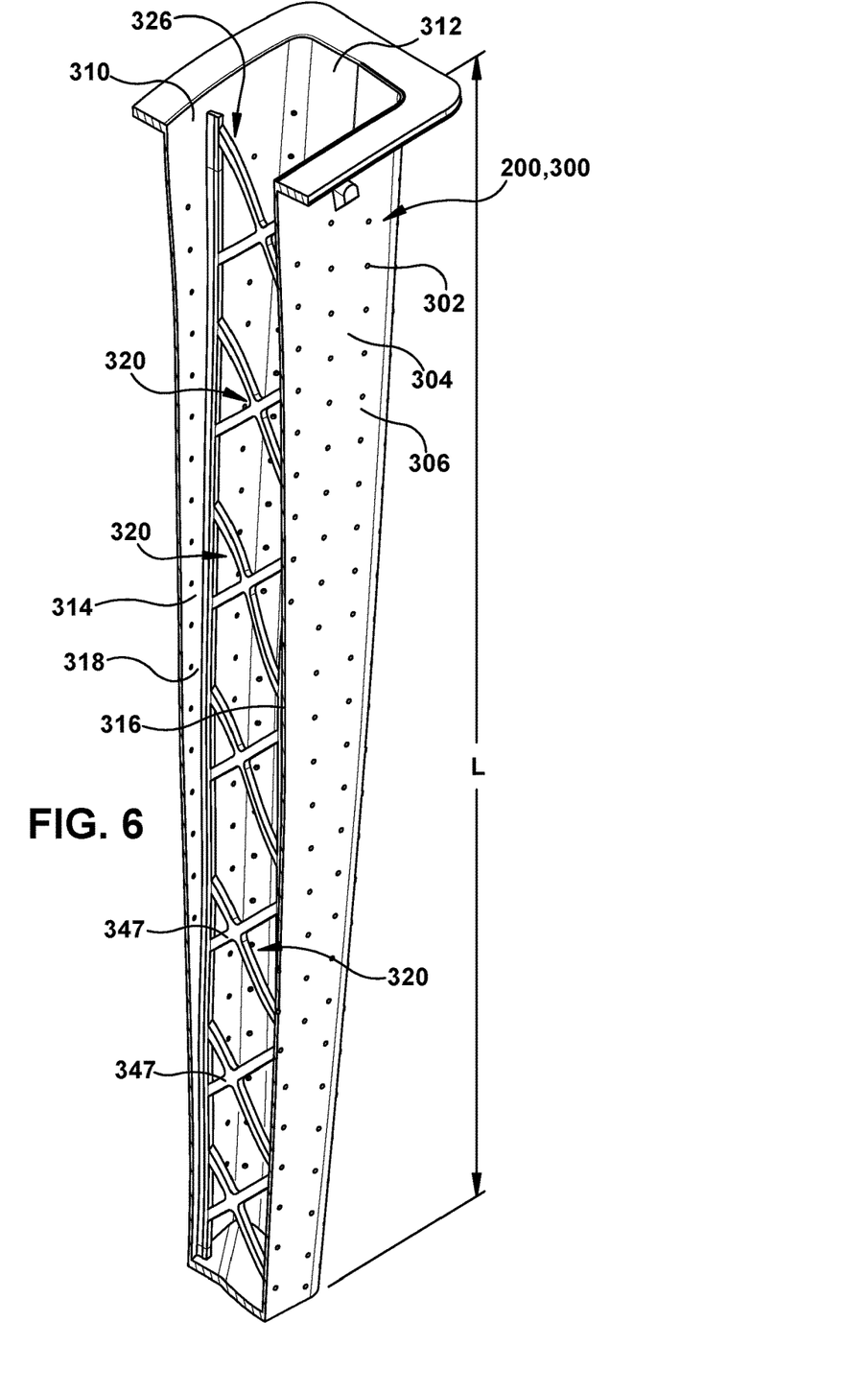
FIG. 6 shows a longitudinal cross-section view of a hollow body component according to embodiments of the disclosure along line 6-6 in FIG. 5.
Figure 7:
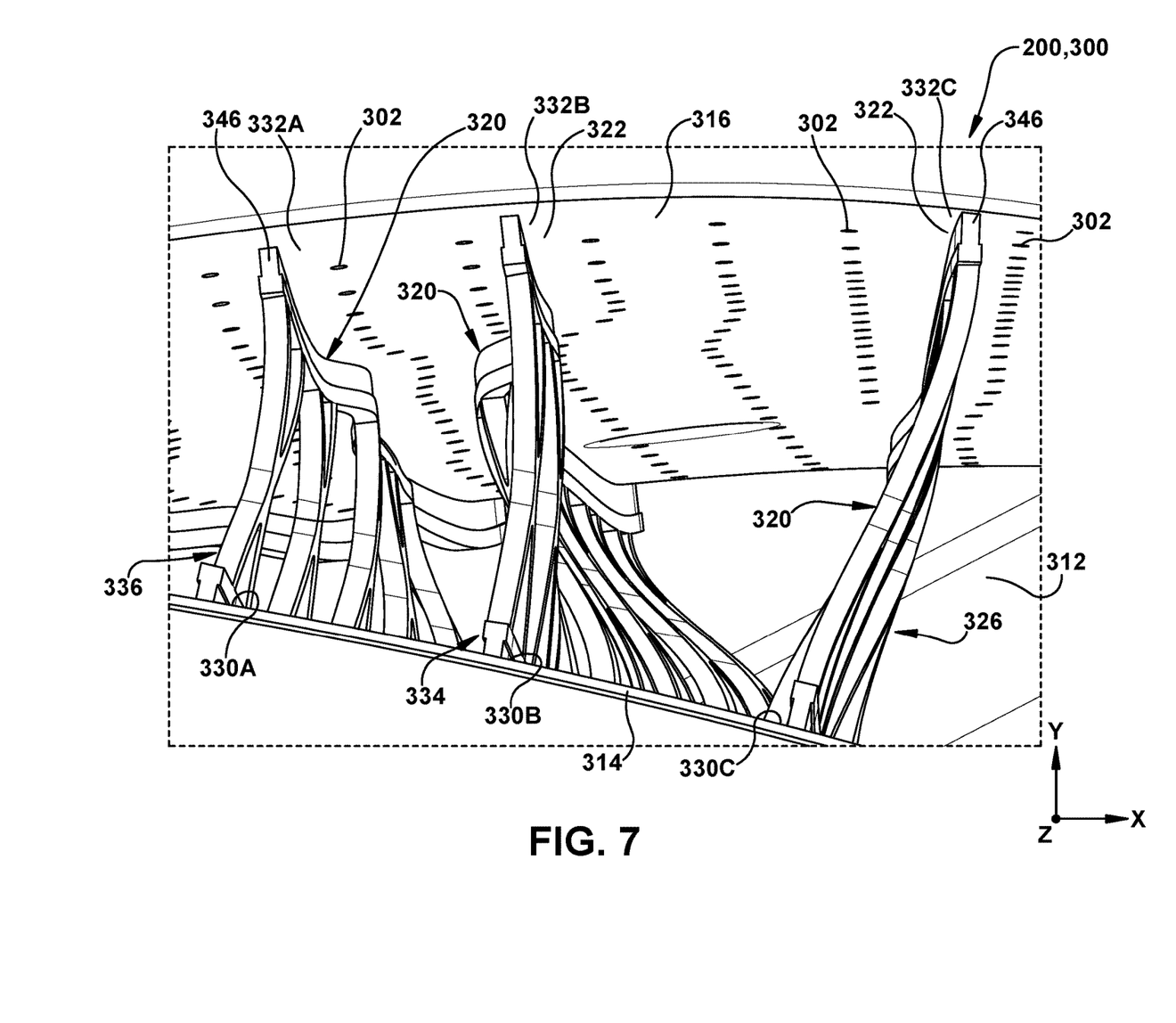
FIG. 7 shows an enlarged, partial top view a hollow body component according to embodiments of the disclosure.
Figure 8:
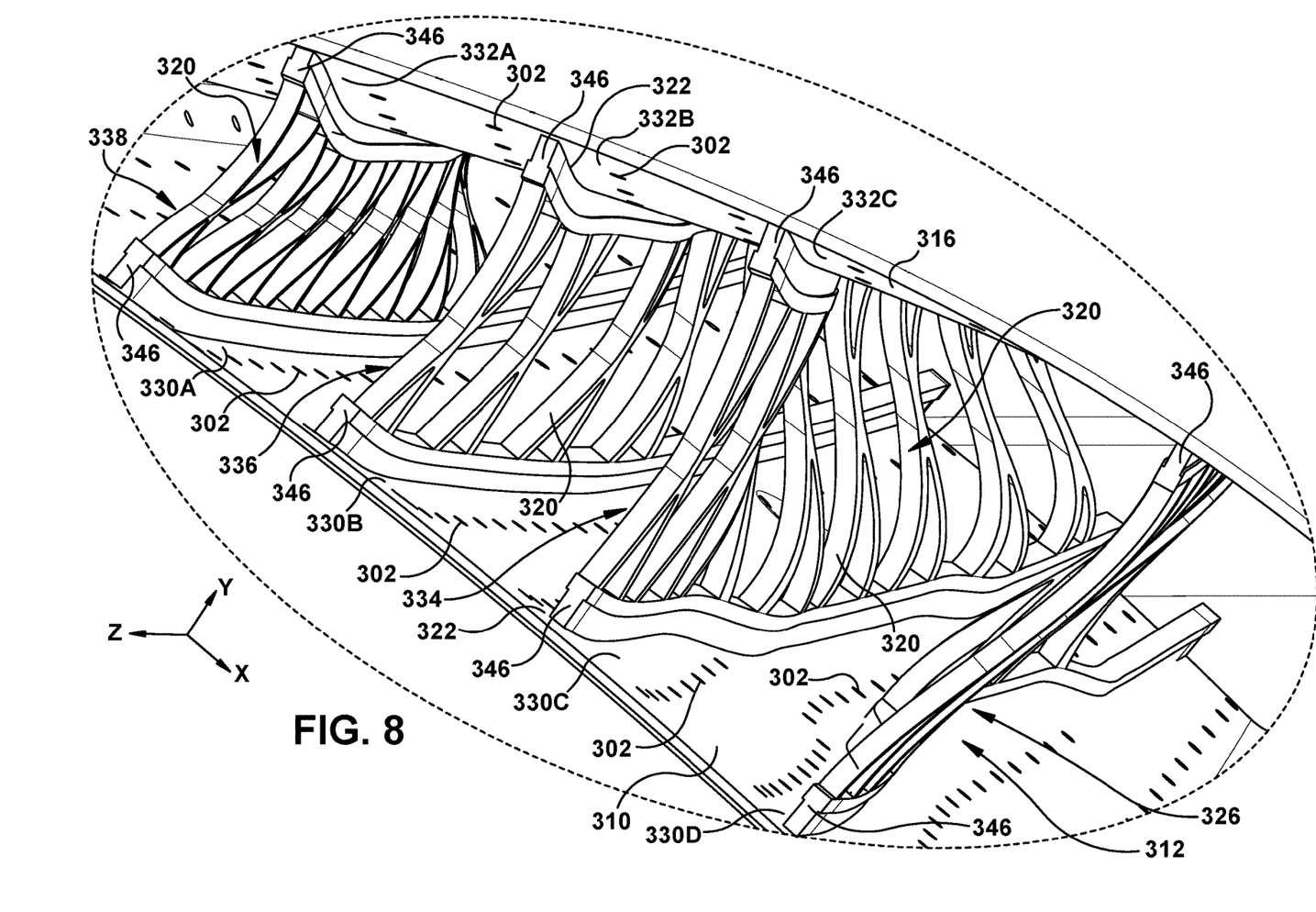
FIG. 8 shows an enlarged, partial top view a hollow body component according to another embodiment of the disclosure.

FIG. 5 shows a top view into hollow body component 200, FIG. 6 shows a longitudinal cross-section view of hollow body component 200 along line 6-6 in FIG. 5, FIG. 7 shows an enlarged, partial top view into hollow body component 200, and FIG. 8 shows an enlarged, partial top view into another embodiment of hollow body component 200. Hollow body component 200 includes a hollow body 310 having a longitudinal extent L (FIG. 6 only), exterior surface 306 and an interior surface 312. Longitudinal extent L may be any length necessary for operation of the particular hollow body component 200, which depends on its function. An impingement insert may have a length to match that of an interior space in, for example, a turbomachine nozzle or blade. Interior surface 312 has a first side 314 and an opposing, second side 316. Sides 314, 316 are shown as directly opposing in the embodiments shown. It is emphasized however that sides 314, 316 may have any opposing arrangement in which a curved support, described herein, may extend across to support. For example, sides 314, 316 may be immediately adjacent one another and may form a corner of hollow body component 200.

As shown best in FIGS. 5 and 7, hollow body component 200 also includes a first set 326 of curved supports 320 curved along lengths thereof and extending between first side 314 and opposing, second side 316 to support hollow body 310 at least during the additive manufacturing thereof. As understood, curved supports 320 may remain after additive manufacture and thus may also support hollow body component 200 during use thereof. Alternatively, curved supports 320 can be removed after manufacture. Curved supports 200 may curve in any fashion along their lengths. As observed in FIGS. 5 and 7, the curve may extend in one direction for some supports, or extend in one direction then switch to the other direction forming a double curve in other supports. For example, curved supports 320 may curve along their lengths in an axial direction X, a circumferential direction Y (e.g., relative to axis of turbomachine) and/or a radial direction Z (e.g., relative to axis of turbomachine), and may twist along a least a portion of their lengths. The degree of curve in curved supports 320 may vary from support to support. Curves in curved supports 320 may serve a number of purposes, for example, to accommodate a desired connection or landing area 322 (hereafter "connection areas 322") at ends thereof on a respective side 314, 316. Here, connection areas 322 on sides 314, 316 may not be directly across from one another (i.e., aligned) because, for example, other structure prohibits alignment or a curved interior surface 312 otherwise prohibits such alignment.

Where hollow body component 200 includes impingement insert 300, the other structure that makes curved supports 320 advantageous includes plurality of cooling passages 302 open to interior surface 312. In this setting, curved supports 320 provide support but also avoid blocking the cooling passages 302. As understood, cooling passages 302 typically pass straight through a wall 318 (FIG. 6) of hollow body 310 to exterior surface 306 allowing a cooling fluid to past therethrough, but this may not be the case in all instances as some curvature, bends or angling of cooling passages 302 within wall 318 (FIG. 6) of hollow body 310 may be possible. As shown best in FIGS. 5 and 7, cooling passages 302 may be arranged on interior surface 312 to create one or more passage-free spaces 330, 332 therebetween. More specifically, a first passage-free space 330 may extend along a first portion of longitudinal extent L on first side 312, and a second, opposing passage-free space 332 may extend along a second portion of longitudinal extent L on opposing, second side 316. Each of first portion and second portion of longitudinal extent L including cooling passages 302 may include at least a part of the length of the extent, e.g., where cooling is desired. Passage-free spaces 330, 332 do not include cooling passages 302 therein, i.e., cooling passages 302 are positioned adjacent to passage-free spaces 330, 332 relative to interior surface 312. It is noted that cooling passages 302 may pass behind spaces 330, 332 in wall 318, where sufficient thickness in wall 318 is provided. Passage-free spaces 330, 332 may act as connection areas 322 for curved supports 320, i.e., where curved supports 320 couple to sides 314, 316. Any number of opposing pairs of passage-free spaces 330, 332 may be provided. For example, passage-free spaces 330A, 332A; 330B, 332B; and 330C, 332C form three opposing pairs of passage-free spaces upon which curved supports 320 can be coupled to each side 314, 316. Any number of opposing pairs may be used depending on the size of hollow body component 200, support needed, etc.

Cooling passages 302 may be placed where necessary to provide the desired cooling, and passage-free spaces 330, 332 may be routed about cooling passages 302. Curved supports 320 coupled to passage-free spaces 330, 332 thus do not block cooling passages 302 and thus do not hinder cooling of hollow body component 200. As shown best in FIGS. 7 and 8, at least one of passage-free spaces 330, 332 (see, e.g., passage-free space pairs 330A, 332A and 330B, 332B in FIG. 7) may extend in a non-linear layout. That is, they may extend in an angled or curved path along portions of longitudinal extent L (FIG. 6) to accommodate cooling passage 302 placement, i.e., radially along Z axis. The extent of non-linearity can vary depending on the required placement of cooling passages 302—compare the first set 326 of curved supports 320 to a second set 334 or a third set 336 of curved supports 320 in FIG. 7. FIG. 8 shows four sets 326, 334, 336, 338 of curved supports 320, each with varying non-linearity. Curved supports 320 each extend between first opposing pairs of first passage-free space 330 and second, opposing passage-free space 332 to support hollow body 310 at least during the additive manufacturing thereof. Curved supports 320 may be curved in any fashion along their length to accommodate the curved paths of passage-free spaces 330, 332. As noted, curved supports 320 may curve along their lengths in an axial direction X, a circumferential direction Y (relative to axis of turbomachine) and/or a radial direction Z (relative to axis of turbomachine), and may twist along a least a portion of their lengths. Any number of curved supports 320 may be provided, including all of them or some lesser number. Some of the supports may not curve. As shown best in FIG. 5, each set 326, 334, 336 of curved supports 320 may collectively be arranged in a twisted plane. See also, FIGS. 7 and 8.

As shown in FIGS. 5, 7 and 8, cooling passages 302 may be arranged on interior surface 312 to create more than one opposing pair of passage-free spaces 330, 332. That is, cooling passages 302 may be arranged to have at least one second opposing pair passage-free spaces 330, 332. As also shown in FIGS. 5, 7 and 8, a second set 334 or 336 of curved supports 320 curved along lengths thereof and extend between each of passage-free spaces 330, 332 of each opposing pair of passage-free spaces may be provided to support hollow body 310 at least during the additive manufacturing thereof. In the embodiments shown, three sets 326, 334, 336 of curved supports 320 are provided axially spaced within hollow body 310. FIG. 8 shows another embodiment with four sets 326, 334, 336, 338 of curved supports 320. Any number of sets of curved supports 320 can be used, e.g., one, two, three or more, as may be necessary to support hollow body 310. FIG. 6 shows an embodiment in which only one set 326 of curved supports 320 are employed. Each set 326, 334, 336 may include any number of curved supports 320 spaced along longitudinal extent L (FIG. 6), e.g., one, two or more. The spacing may vary depending on the support needed, and may not be equal along longitudinal extent L (FIG. 6). In the FIG. 6 example, seven curved supports 320 having a cross-bar arrangement are provided.

Figure 9:
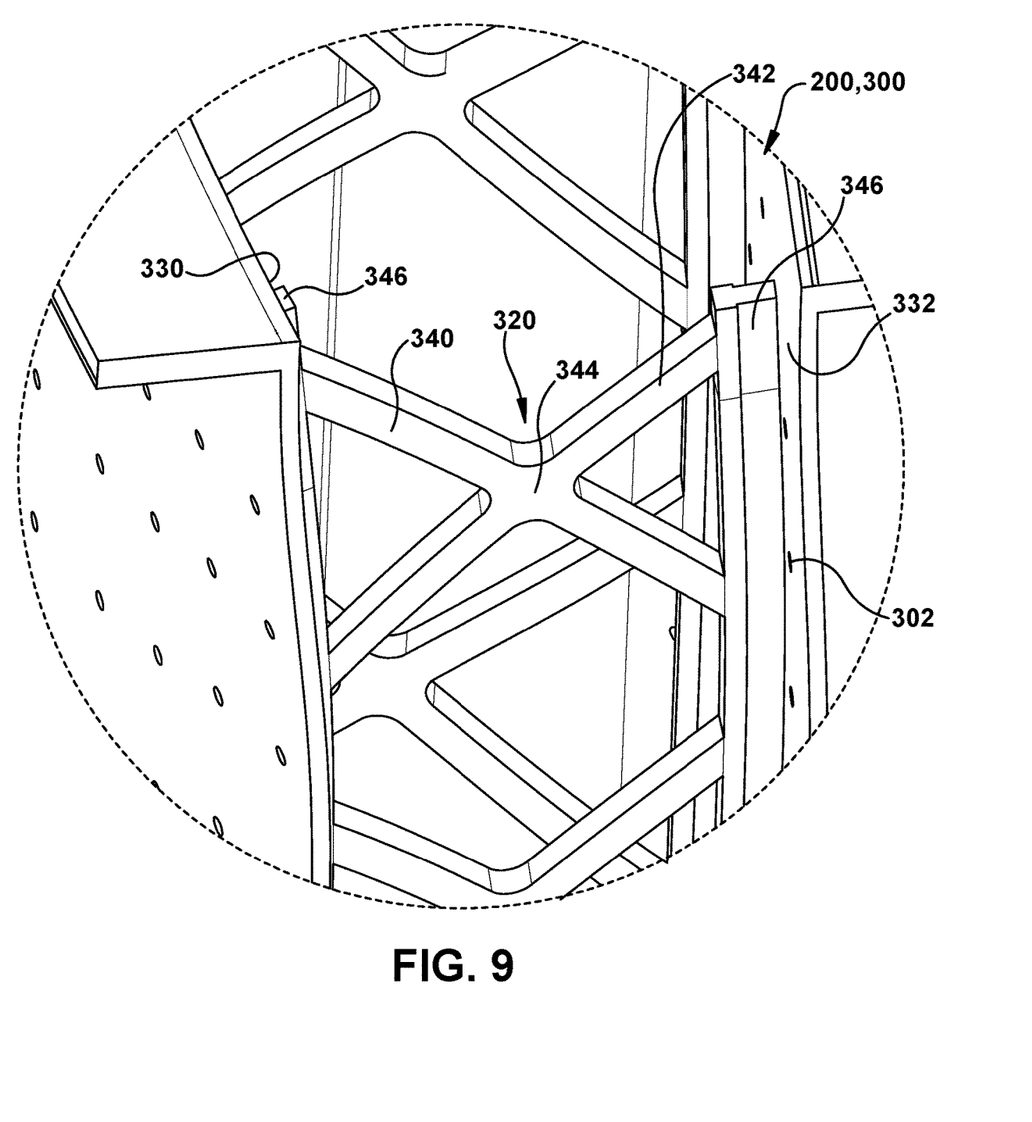
FIG. 9 shows an enlarged, perspective view of a curved support of a hollow body component according to embodiments of the disclosure.

Curved supports 320 can take a variety of forms. In one embodiment, shown in FIGS. 6-9, at least one of curved supports 320 includes a cross-bar arrangement. FIG. 9 shows an enlarged, perspective view of a curved support 320. A cross-bar arrangement can be any form in which individual members 340, 342 of curved supports 320 intersect, i.e., at joint 344. In this fashion, each curved support 320 can create a lattice support structure having greater strength than a simple linear member. In addition, the lattice support structure is open, allowing cooling fluid to easily flow therethrough. FIG. 6 shows how a number of radially spaced curved supports 320 can collectively create a lattice support structure 347 along at least a portion of longitudinal extent L to support hollow body 310. FIG. 6 also shows how first set 326 of curved supports 320 may have different spacing along at least one of the first and second portions on sides 314, 316 of the longitudinal extent L, e.g., curved supports 320 are closer together near a top of hollow body component 200 than near a bottom of hollow body component 200. The spacing may vary depending on where a curved support is necessary, equal spacing is also an option.

Figures 10, 12:
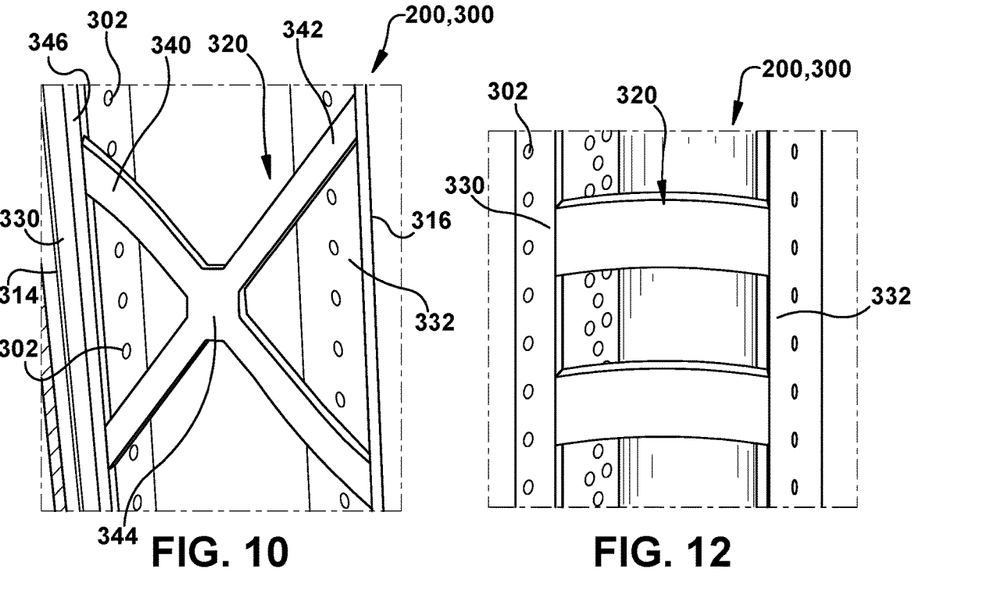
FIG. 10 shows an enlarged, perspective view a curved support of a hollow body component according to embodiments of the disclosure.
FIG. 12 shows an enlarged, perspective view a curved support of a hollow body component according to embodiments of the disclosure.
Figure 11:
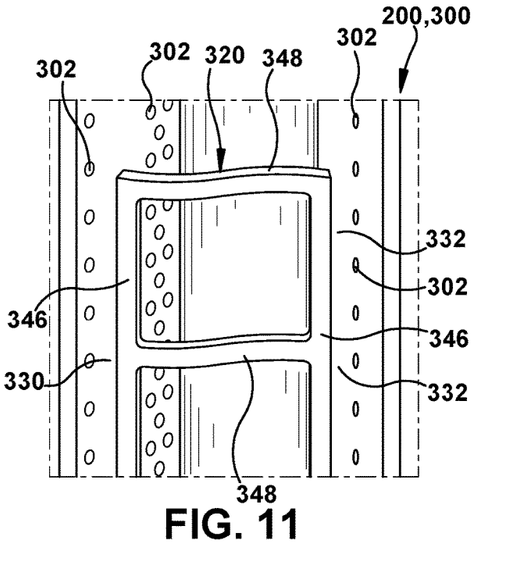
FIG. 11 shows an enlarged, perspective view a curved support of a hollow body component according to embodiments of the disclosure.
Figure 13:
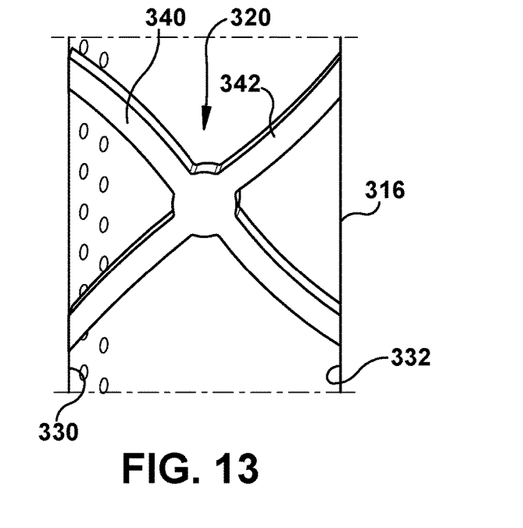
FIG. 13 shows an enlarged, perspective view a curved support of a hollow body component according to embodiments of the disclosure.

In one embodiment, each passage-free space 330, 332 includes a fin 346 extending therefrom, which may add rigidity and strength to curved supports 320. In this fashion, each of first set of curved supports 320 may couple at opposing ends thereof to a respective fin 346. FIGS. 10 and 11 show alternative embodiments of curved supports 320 in which fins 346 are omitted. In this case, each curved support 320 couples directly to a facing surface of passage-free spaces 330, 332. FIG. 10 shows another alternative embodiment in which curved supports 320 include single members (no cross-bar arrangement) 348 coupled to fins 346 on passage-free spaces 330, 332. FIG. 11 shows the embodiment of FIG. 10, but with no fin 346 (FIG. 10) on passage-free spaces 330, 332. FIG. 12 shows the FIG. 9 embodiment with cross-bar arrangements for curved supports 320 but with no fins 346 (FIG. 10) on passage-free spaces 330, 332.

Curved supports 320, as described herein, also have an open-cell format, meaning in an area enclosed by their structure there is more open space than material. In this fashion, curved supports 320 provide support for hollow body 310 without hindering cooling fluid flow when hollow body component 200 takes the form of an impingement insert 300. While certain example shapes of curved supports 320 have been provided herein, it is emphasized that curved supports 320 can have a large variety of alternative configurations, e.g., shapes, cross-sections, curves, angles of connection, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A component made by additive manufacturing, the component comprising:
   a hollow body having a longitudinal extent, an exterior surface and an interior surface, the interior surface having a first side and an opposing, second side;
   a first set of curved supports curved along lengths thereof and extending between the first side and the opposing, second side to support the hollow body, wherein the first set of curved supports includes a cross-bar arrangement, wherein the first set of curved supports is formed in a double curve from two of an axial direction, a circumferential direction, and a radial direction, and wherein the first set of curved supports form a lattice support, and wherein the first set of curved supports are formed in an open-cell format; and a plurality of cooling passages open to the interior surface, the plurality of cooling passages arranged on the interior surface to have a first opposing pair of a first passage-free space extending along a first portion of the longitudinal extent on the first side and a second, opposing passage-free space extending along a second portion of the longitudinal extent on the opposing, second side, wherein each passage-free space forms a connection area for one of the curved supports, and wherein the curved supports couple to the first side or the second side;

wherein the first set of curved supports each extend between the first opposing pair of the first passage-free space and the second, opposing passage-free space to support the hollow body, and wherein each passage-free space includes a fin extending therefrom, each of the first set of curved supports coupled at opposing ends thereof to a respective fin.

2. The component of claim 1, wherein at least one of the first and second passage-free spaces extend in a non-linear layout, and each of the first set of curved supports curve to accommodate the non-linear layout.

3. The component of claim 2, wherein the first set of curved supports collectively are arranged in a twisted plane.

4. The component of claim 1, wherein the first plurality of cooling passages are arranged on the interior surface to have at least one second opposing pair of the first passage-free space extending along the first portion of the longitudinal extent on the first side and the second, opposing passage-free space extending along the second portion of the longitudinal extent on the opposing, second side; and further comprising a second set of curved supports curved along lengths thereof and extending between each of the at least one second opposing pair of the first passage-free space and the second, opposing passage-free space to support the hollow body.

5. The component of claim 1, wherein the component is an impingement insert for a hot gas path component, and further comprising a plurality of seating fins extending from the exterior surface for positioning the component inside the hot gas path component.

6. The component of claim 1, wherein the first set of curved supports have different spacing along at least one of the first and second portions of the longitudinal extent.

7. An impingement insert for a hot gas path component, the impingement insert made by additive manufacturing, the impingement insert comprising:

a hollow body having a longitudinal extent, an exterior surface and an interior surface, the interior surface having a first side and an opposing, second side;

a plurality of cooling passages passing between the exterior surface and the interior surface, the plurality of cooling passages arranged on the interior surface to have a first opposing pair of a first passage-free space extending along a first portion of the longitudinal extent on the first side and a second, opposing passage-free space extending along a second portion of the longitudinal extent on the opposing, second side; and a first set of curved supports extending between the first opposing pair of the first passage-free space and the second, opposing passage-free space to support the hollow body, wherein the first set of curved supports includes a cross-bar arrangement, wherein the first set of curved supports is formed in a double curve from two of an axial direction, a circumferential direction, and a radial direction, wherein the first set of curved supports form a lattice support, and wherein the first set of curved supports are formed in an open-cell format, wherein each passage-free space forms a connection area for one of the curved supports, wherein the curved supports couple to the first side or the second side, and wherein the curved supports couple to the first side or the second side and wherein each passage-free space includes a fin extending therefrom, each of the first set of curved supports coupled at opposing ends thereof to a respective fin.

8. The impingement insert of claim 7, wherein at least one of the first and second passage-free spaces extend in a non-linear layout, and the first set of curved supports curve to accommodate the non-linear layout.

9. The impingement insert of claim 8, wherein each of the first set of curved supports curve to accommodate the non-linear layout.

10. The impingement insert of claim 9, wherein the first set of curved supports collectively are arranged in a twisted plane.

11. The impingement insert of claim 7, wherein the plurality of cooling passages are arranged on the interior surface to have at least one second opposing pair of the first passage-free space extending along the first portion of the longitudinal extent on the first side and the second, opposing passage-free space extending along the second portion of the longitudinal extent on the opposing, second side; and further comprising a second set of curved supports extending between each of the at least one second opposing pair of the first passage-free space and the second, opposing passage-free space to support the hollow body.

12. The impingement insert of claim 7, wherein the first set of curved supports have different spacing along at least one of the first and second portions of the longitudinal extent.

13. A non-transitory computer readable storage medium storing code representative of an impingement insert for a hot gas path component, the impingement insert physically generated upon execution of the code by a computerized additive manufacturing system, the code comprising:

code representing the impingement insert, the impingement insert including:

a hollow body having a longitudinal extent, an exterior surface and an interior surface, the interior surface having a first side and an opposing, second side;

a plurality of cooling passages passing between the exterior surface and the interior surface, the plurality of cooling passages arranged on the interior surface to have a first opposing pair of a first passage-free space extending along a first portion of the longitudinal extent on the first side and a second, opposing passage-free space extending along a second portion of the longitudinal extent on the opposing, second side; and a first set of curved supports extending between the first opposing pair of the first passage-free space and the second, opposing passage-free space to support the hollow body, wherein the first set of curved supports includes a cross-bar arrangement, wherein the first set of curved supports is formed in a double curve from two of an axial direction, a circumferential direction, and a radial direction, wherein the first set of curved supports form a lattice support, and wherein the first set of curved supports are formed in an open-cell format, wherein each passage-free space forms a connection area for one of the curved supports, wherein the curved supports couple to the first side or the second side, and wherein the curved supports couple to the first side or the second side and wherein each passage-free space includes a fin extending therefrom, each of the first set of curved supports coupled at opposing ends thereof to a respective fin.

14. The storage medium of claim 13, wherein at least one of the first and second passage-free spaces extend in a non-linear layout, and the first set of curved supports curve along lengths thereof to accommodate the non-linear layout.

15. The storage medium of claim 13, wherein the plurality of cooling passages are arranged on the interior surface to have at least one second opposing pair of the first passage-free space extending along the first portion of the longitudinal extent on the first side and the second, opposing passage-free space extending along the second portion of the longitudinal extent on the opposing, second side; and further comprising a second set of curved supports extending between each of the at least one second opposing pair of the first passage-free space and the second, opposing passage-free space to support the hollow body.

\* \* \* \* \*